United States Patent
Matsumoto

[11] Patent Number: 5,848,353
[45] Date of Patent: Dec. 8, 1998

[54] MOBILE COMMUNICATION SYSTEM AND MOBILE PHONE SET HAVING ANALOG/DIGITAL CAPABILITY

[75] Inventor: Mariko Matsumoto, Tokyo, Japan

[73] Assignee: NEC Corporation, Japan

[21] Appl. No.: 81,426

[22] Filed: Jun. 22, 1993

[30] Foreign Application Priority Data

Jun. 23, 1992 [JP] Japan ................................. 4-163245

[51] Int. Cl.⁶ ........................................ H04B 7/26
[52] U.S. Cl. ..................... 455/11.1; 455/422; 455/552; 455/575; 455/74
[58] Field of Search ............... 455/33.1, 33.4, 455/54.1, 54.2, 56.1, 74, 11.1, 15, 422, 550, 552, 561, 575; 375/5, 216; 379/59

[56] References Cited

U.S. PATENT DOCUMENTS

| | | | |
|---|---|---|---|
| 4,539,706 | 9/1985 | Mears et al. | 455/11.1 |
| 4,659,878 | 4/1987 | Gilbert M. Dinkins . | |
| 5,228,074 | 7/1993 | Mizikovsky | 379/59 |
| 5,276,686 | 1/1994 | Ito | 455/33.1 |

FOREIGN PATENT DOCUMENTS 8904569 5/1989 WIPO .

*Primary Examiner*—Thanh Congle
*Attorney, Agent, or Firm*—Ostrolenk, Faber, Gerb & Soffen, LLP

[57] ABSTRACT

A mobile phone set includes a base unit and at least one handset belonging to the base unit. In the base unit, a receiving section 11 receives a first modulated wave $S_1$ which is a digital modulated wave from TX 3, and a demodulating section 12 demodulates the received wave, and further a decoding section 13 decodes the demodulated wave. Further, a detecting section 17 detects the demodulated wave. Further, a detecting section 17 detects that the decoded signal is of a calling signal for the handsets 2-1 and 2-2 associated with the base unit, and after the detection a controlling section 25 instructs a D/A converting section 14 to D/a convert a digital signal decoded by the decoding section 13 to an analog signal and a modulating section 15 to modulate the analog signal. A transmitting section 16 transmits a second modulated wave $S_2$ as the analog modulated wave to the handset 2-1 or 2-2. Further, in the base unit 1, a receiving section 18 receives a third modulated wave $S_3$ as the analog modulated wave from the handset 2-1 for example, and a demodulating section 19 demodulates the received wave.

2 Claims, 2 Drawing Sheets

MOBILE COMMUNICATION SYSTEM AND MOBILE PHONE SET HAVING ANALOG/DIGITAL CAPABILITY

BACKGROUND OF THE INVENTION

1. Field of the Invention

The present invention relates to a mobile communication system and a mobile radiotelephone set.

2. Description of the Prior Art

Although mobile radiotelephones (hereinafter referred to as "mobile phone") are popularized at present, such prior art mobile phone are usable only inside a mobile. Use thereof outside the mobile requires some measures, say in one measure, a phone set body installed ordinarily inside the mobile is taken out of the mobile together with a transmitter/receiver or a handset and they are carried on a shoulder of a user.

Noticed that there has been prevailed recently a cordless telephone for radio communication between a base unit and a handset, construction of a mobile phone with such base unit a handset permits the base unit to be installed intactly inside the mobile, which further allows communication from the outside of the mobile simply by carrying out and using the handset outside the mobile.

This enables a mobile phone comprised of a base unit and a handset to be realized with a digital communication system, but it is thereupon desired to achieve the circuit construction of an entire system in a simplified manner and at a low cost to the utmost.

SUMMARY OF THE INVENTION

To solve the difficulties with the prior art, it is an object of the present invention to provide a low cost mobile phone system and set with a simplified circuitry capable of utilization even outside a mobile.

To achieve the above object, a mobile phone set comprises a base unit and at least one handset capable of radio transmission/reception with said base unit, said base unit being capable of digital transmission/reception between a fixed transmitting station and the base unit and the handset being capable of analogue transmission/reception between the base unit and the handset.

DETAILED DESCRIPTION OF THE PREFERRED EMBODIMENT

In what follows, there will be described the present invention with reference to the accompanying drawings.

An embodiment of a mobile phone set according to the present invention comprises a base unit installed inside a mobile and at least one handset.

Figure 1:
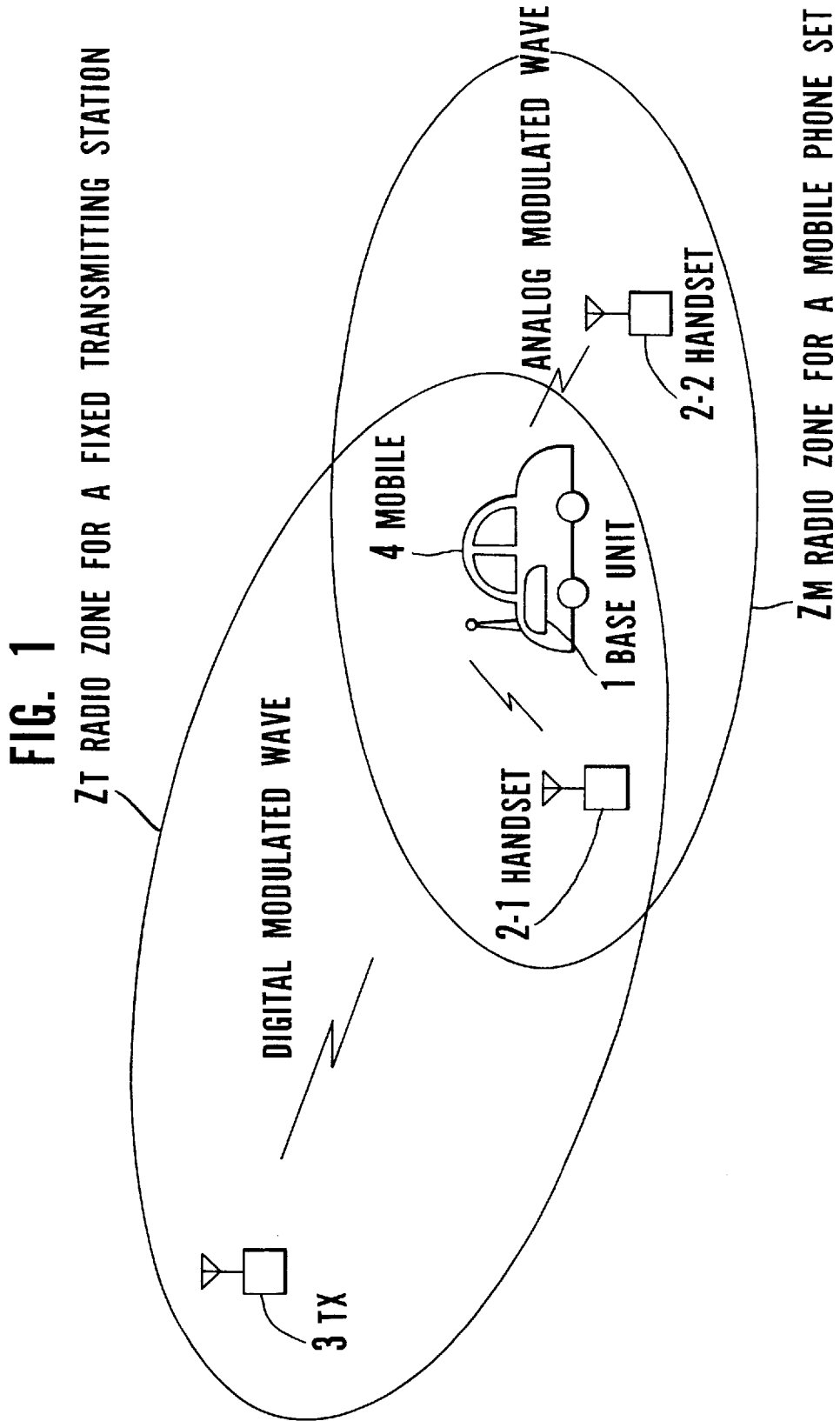
FIG. 1 is a view exemplarily illustrating a mobile radio communication system including a mobile phone set according to the present invention.

Referring to FIG. 1, there is illustrated a mobile radio communication system including a mobile phone set.

The mobile radio communication system comprises a fixed transmitting station (hereinafter referred to as a TX) 3, a base unit 1 mounted on a mobile 4 located in a radio zone $Z_T$ for a fixed transmitting station which is a communication region mediating a digital modulated wave of an electric wave transmitted from TX 3, and handsets 2-1 and 2-2 each located in a radio zone $Z_M$ for a mobile phone set which is a communication region mediating an analog modulated wave of an electric wave transmitted from the base unit in the mobile. Both handsets 2-1 and 2-2 have the same structure and the same circuitry and operate in the same manner.

Once the base unit 1 of the present invention receives a signal to the handsets 2-1 and 2-2 associated with the base unit 1 from TX 3 in the radio zone $Z_T$, the base unit 1 converts the signal to an analog modulated wave and transmits it to the handsets 2-1 and 2-2 located in the radio zone $Z_M$. Further, an analog modulated wave transmitted from the handset 2-1 for example is received by the base unit 1 which then converts the analog modulated wave to a digital modulated wave and transmits it to TX 3.

Figure 2:
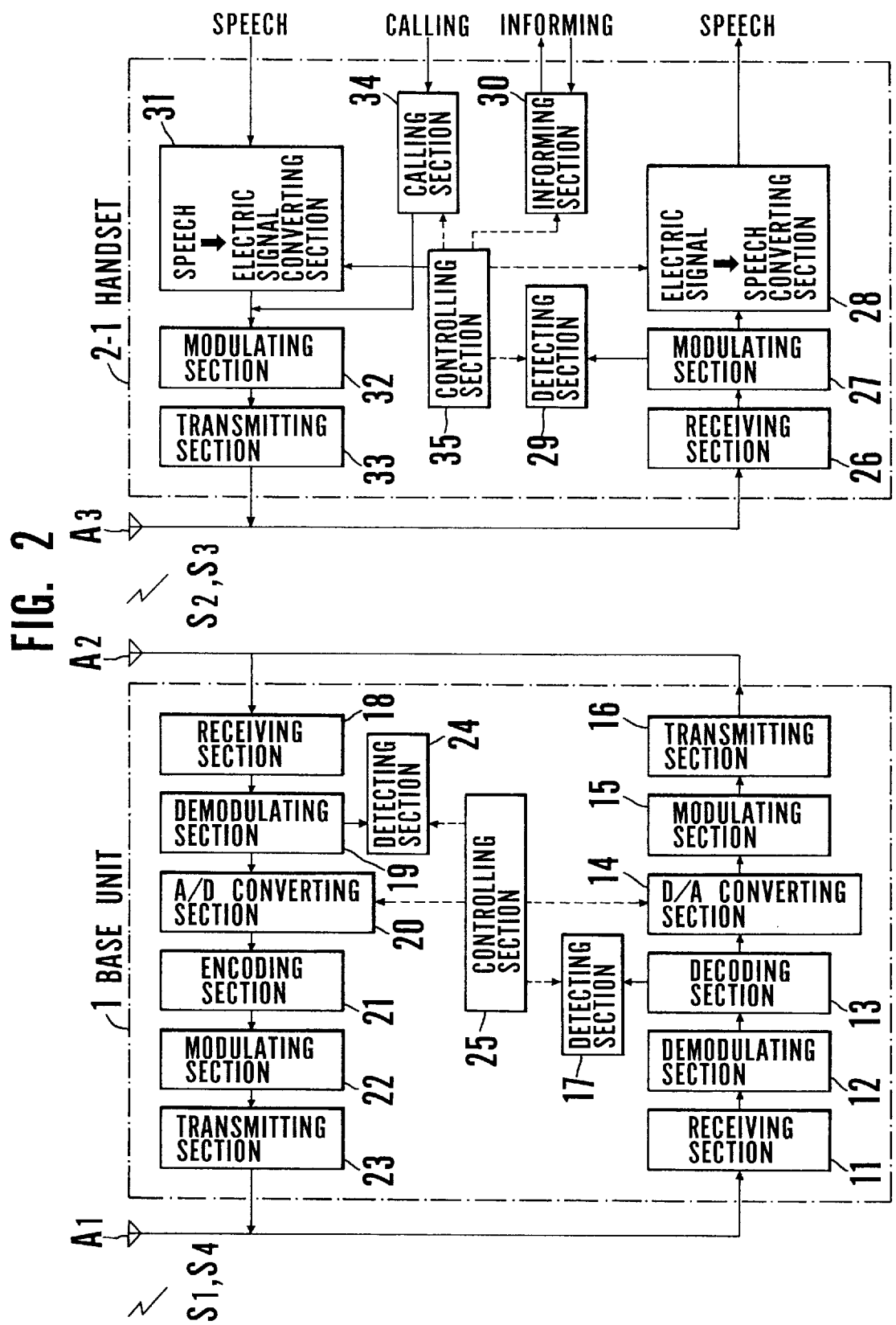
FIG. 2 is a block diagram illustrating a preferred embodiment of a mobile phone set according to the present invention.

Referring to FIG. 2, there is illustrated an embodiment of a mobile phone set according to the present invention in a form of a block diagram.

As illustrated in FIG. 2, a mobile phone set of the present embodiment comprises a base unit 1 and a handset 2-1 or 2-2 belonging to the base unit 1.

The base unit 1 comprises a receiving section 11 for receiving section 11 for receiving through an antenna A1 a first modulated wave $S_1$ (digital modulated wave) transmitted from a fixed transmitting station TX a demodulating section 12 for demodulating the first modulated wave, a decoding section 13 for decoding a first demodulated wave demodulated by the demodulating section 12, a detecting section 17 for detecting whether or not a decoded signal is of a signal directed to the base unit 1, a D/A converting section 14 for converting the decoded signal to an analog signal to transmit the same signal to the handset 2-1, a modulating section 15 for modulating a converted analog signal to a second modulated wave (analog modulated wave), a transmitting section 16 for transmitting through an antenna $A_2$ the second modulated wave to the handset 2-1, a receiving section 18 for receiving a third modulated wave (analog modulated wave) transmitted from the handset 2-1, a demodulating section 19 for demodulating the third demodulated wave, a detecting section 24 for detecting whether or not the third modulated wave is of a signal to the base unit 1, an A/D converting section 20 for converting an output from the demodulating section 19 to a digital signal, an encoding section 21 for encoding the digital signal from the A/D converting section 20 for transmission to a digital signal fixed transmitting station TX, a modulating section 22 for modulating an encoded digital signal to a second modulated wave (digital modulated wave), a transmitting section 23 for transmitting the second modulated wave to the fixed transmitting station, and a control section 25 for controlling the whole of the base unit 1.

Likewise, as illustrated in FIG. 2, the handset 2-1 comprises a receiving section 26 for receiving through an antenna $A_3$ the second modulated wave $S_2$ (analog modulated wave) transmitted from the base unit 1, a demodulating section 27 for demodulating the second modulated wave, an electric signal-speech converting section 28 for converting the demodulated signal to a speech, a detecting section 29 for detecting that the demodulated wave is a signal of itself, a speech-electric signal converting section 31 for converting a speech signal to an electric signal, a modulating section 32 for modulating the electric signal from the speech-electric signal converting section 31, a transmitting section 33 for transmitting a third modulated wave $S_3$ from the modulating section 32 therefrom as an analog modulated wave, a calling section 34 for generating a calling signal after receiving a call, a called part for issuing an informing signal when the foregoing detecting section 29 detects that the demodulated signal is of a signal of itself, and a controlling section 35 for controlling the operation of the respective circuit components.

Operation of the present embodiment will be described with reference to FIGS. 1 and 2.

In the base unit 1, the receiving section 11 receives the first modulated wave $S_1$ which is a digital modulated wave from TX 3, and the demodulating section 12 demodulates the received signal, and further the decoding section 13 decodes the demodulated wave. Further, the detecting section 17 detects that the decoded signal is of a calling signal for the handset 2-1 owned thereby, and the controlling section 25 instructs, after the detection, the D/A converting section 14 to D/A convert the digital signal decoded by the decoding section 13 into the analog signal. The modulating section 15 thereafter modulates the analog signal, and the transmitting section 16 transmits the second modulated wave $S_2$ as the analog modulated wave to the handset 2-1.

Further, in the base unit 1, the receiving section 18 receives the third modulated wave $S_3$ which is an analog modulated wave transmitted from the handset 2-1 for example, and the demodulating section 19 demodulates the received wave, and further the detecting section 24 detects that the demodulated signal is of a signal of itself. The controlling section 25 instructs, after the detection, the A/D converting section 20 to A/D convert the demodulated analog signal wave to a digital signal, and the encoding section 21 encodes the digital signal. The modulating section 22 modulates the encoded signal and the transmitting section 23 transmits the third modulated wave as the digital modulated wave to TX 3.

In contrast, in the handset 2-1, the receiving section 26 receives the second modulated wave $S_2$ which is an analog modulated wave from the base unit 1, and the demodulating section 27 demodulates the received wave and further the detecting section 29 detects that the demodulated wave is of a signal of itself. The controlling section 35 instructs, after the detection, the informing section 30 to issue an informing signal. Thereafter, once the informing section 30 receives a called signal, the controlling section 35 issues the electric signal-speech converting section 28 to convert the demodulated signal wave to a speech, while once it receives a speech signal, the controlling section 35 issues the speech-electric signal converting section 31 to convert the speech signal to an electric signal, and the modulating section 32 modulates the electric signal and the transmitting section 33 transmits the third modulated wave $S_3$ as an analog modulated wave.

Further, in the handset 2-1, the calling section issues a calling signal after receiving a call, and the modulating section 32 modulates the calling signal and the transmitting section 33 transmits the modulated wave. Thereafter, the receiving section 26 receives the second modulated wave $S_2$ and the modulating section 27 modulates the received wave, and the detecting section 29 detects that the modulated wave is of a called signal. The controlling section 35 instructs, after the detection, the electric signal-speech converting section 28 to convert the demodulated signal wave to a speech, while the speech-electric signal converting section 31 converts a speech signal after receiving the same to an electric signal. The modulating section 32 modulates the electric signal and the transmitting section 33 transmits the third modulated wave $S_3$ as an analog modulated wave.

It is self-evident now that provided the D/A converting section 14 is altered to the A/D converting section 20 in the present embodiment, a base unit may be realized where an analog modulated wave received from TX is converted to a digital modulated wave and transmitted to the handset 2-1, and that provided the D/A converting section 14 and the A/D converting section 20 are eliminated, or provided they are altered to the encoding section 21, respectively, a base unit 1 is realized where a digital modulated wave received from the TX is transmitted to the handsets 2-1 and 2-2 as a digital modulated wave.

In the embodiment shown in FIG. 2, the base unit 1 has two antennas $A_1$ and $A_2$ for separate purposes, however a single antenna may be use for these purposes.

According to the present invention, as described above, the following effects ensured:

1) The mobile phone set is useable outside a mobile.
2) Power is supplied from a battery at all times, so that the child radiotelephone set is reducible in its size compared with prior art portable radiotelephone sets.
3) The base unit executes many functions required after the radio waves from TX are received, and the handset may singly have only low functions, so that the entire apparatus is made light-weighted.
4) A digital communication system is realized in a mobile phone set with handsets of a simple circuitry.
5) Some radio communications are possible with a single mobile phone set.

What is claimed is:

1. A mobile phone set comprising:
a base unit and at least one handset, said base unit being for digital radio communication with a fixed transmitting station and for analog radio communication with said handset, said base unit comprising:
a first receiving section for receiving a first modulated digital wave transmitted from the fixed transmitting station and for converting the first modulated wave to a first modulated digital signal;
a first demodulating section for demodulating said first modulated signal to create a first demodulated signal;
a first detecting section for detecting whether or not the first demodulated signal is of a signal to the base unit;
a first modulating section for modulating said demodulated signal to generate a second modulated analog signal for transmission to the handset;
a first radio transmitting section for converting the second modulated analog signal to a second modulated analog wave and for transmitting the second modulated analog wave to said handset;
a second receiving section for receiving a third modulated analog wave transmitted from said handset and for converting the third modulated analog wave to a third modulated analog signal;
a second demodulating section for demodulating said third modulated signal to create a second demodulated signal;
a second detecting section for detecting whether or not the second demodulated signal is of a signal of itself;
a controlling section for instructing radio transmission to said handset after receiving a detection signal from said first detecting section and for instructing radio transmission to said fixed transmitting station after receiving a detecting signal from said second detecting section;
a second modulating section for modulating the second demodulated signal from said second demodulating section to create a fourth modulated digital signal for transmission to said fixed transmitting station; and a second radio transmitting section for converting the fourth modulated digital signal to a fourth modulated digital wave and for transmitting the fourth modulated digital wave to said fixed transmitting station.

2. A mobile phone set according to claim 1 wherein each said handset comprises:

a receiving section for receiving the second modulated analog wave which is an analog modulated wave from the base unit;

a demodulating section for demodulating the second modulated wave;

an electric signal-speech converting section for converting the demodulated signal to a speech;

a detecting section for detecting that the demodulated wave is of a signal of itself;

a speech-electric signal converting section for converting a speech signal to an electric signal;

a modulating section for modulating the electric signal from the speech-electric signal converting section;

a transmitting section for transmitting the third modulated wave from the modulating section as an analog modulated wave;

a calling section for issuing an informing signal when said detecting section detects that the demodulated signal is of a signal of itself; and a controlling section for controlling each operation of each circuit component.

* * * * *